United States Patent [19]

Salzmann et al.

[11] 3,970,914

[45] July 20, 1976

[54] CIRCUIT ARRANGEMENT INCLUDING A NUMBER OF CONVERTERS, IN PARTICULAR DIRECT CONVERTERS, IN Y CONNECTION

[75] Inventors: Theodor Salzmann; Franz Wesselak; Wolfgang Timpe, all of Erlangen, Germany

[73] Assignee: Siemens Aktiengesellschaft, Munich, Germany

[22] Filed: Mar. 24, 1975

[21] Appl. No.: 561,279

[30] Foreign Application Priority Data

Mar. 29, 1974 Germany............................. 2415398

[52] U.S. Cl............................................ 321/2; 321/5; 321/9 R; 321/27 R; 318/227
[51] Int. Cl.²......................................... H02M 5/45
[58] Field of Search ............... 318/227; 321/2, 5, 18, 321/27 R, 69 R, 9 R

[56] References Cited
UNITED STATES PATENTS

| | | |
|---|---|---|
| 3,274,482 | 9/1966 | Depenbrock.................. 321/27 R X |
| 3,332,002 | 7/1967 | Jollois........................... 321/69 R X |
| 3,539,901 | 11/1970 | Rosenberry, Jr. et al. ....... 321/69 X |
| 3,622,859 | 11/1971 | Williamson.................... 321/69 R X |
| 3,659,168 | 4/1972 | Salihi et al. .......................... 321/5 X |
| 3,702,429 | 11/1972 | Sawyer et al. ....................... 318/227 |

Primary Examiner—William M. Shoop
Attorney, Agent, or Firm—Kenyon & Kenyon Reilly Carr & Chapin

[57] ABSTRACT

A circuit arrangement is disclosed comprising three direct converters which are fed from an a.c. voltage network. The converters are arranged in a Y configuration and are connected to a three-phase load. To increase the transmitted power and to vary the reactive power requirement, the circuit arrangement is provided with means for generating a control voltage for the control unit of at least one of the three converters such that the output voltage of this converter has a periodic waveform which includes essentially no fifth and seventh order harmonics. Additionally, the load-side conductor currents of the three converters are controlled with control signals having sinusoidal waveforms. A particular form used for the control voltage is a trapezoidal waveform.

35 Claims, 10 Drawing Figures

CIRCUIT ARRANGEMENT INCLUDING A NUMBER OF CONVERTERS, IN PARTICULAR DIRECT CONVERTERS, IN Y CONNECTION

BACKGROUND OF THE INVENTION

1. Field of the Invention

This invention relates to a circuit arrangement including a number m of converters fed from an a.c. voltage network. In particular it concerns a circuit arrangement comprising an odd number m of direct converters which are arranged in a symmetrical m-phase Y configuration and which are connected to an m-phase symmetrical load such that there is no direct connection between the neutral of the converters and the neutral of the load, the conductor voltages of the converters at the load possessing a given periodic waveform and together forming a symmetrical system.

2. Description of the Prior Art

The above-described type of circuit arrangement is used, for example, to feed rotary field machines or to feed land or board networks. The particular converters used in the circuit arrangement, typically, might be intermediate link converters, pulse inverters or direct converters. Such converters are equipped, in particular, with controllable semiconductor valves, usually thyristors. In a direct converter, generally all output conductors are connected with all input conductors via anti-parallel connected valves. The converting is brought about by a special ignition sequence of the valves. Normally, the output voltage is composed primarily of sections of the input voltage. Therefore, the output voltage is, generally, of a lower frequency than the input voltage.

In the prior art, it is customary to feed three reversible converters from a common a.c. voltage network and to modulate them with voltages which are offset in relation to each other by 120 electrical degrees. One thus obtains a three-phase current system at the output, which can be used, for example, to feed a three-phase current machine. Such a circuit arrangement can be employed also as power supply of land or board networks. When using a symmetrical three-phase load, the line current in all three output conductors is normally regulated in sine-shaped waveform. For this purpose three separate control loops are provided in the circuit arrangement which adjust the control signals of the three direct converters as a function of the deviation between the measured actual values of their line currents and given nominal values.

It is the nature of a direct converter that the network side power factor is relatively small when the direct converter is not fully modulated, because, due to the gating control of the direct converter, its reactive power requirement is high. By the "network-side power factor" it is meant that the cosine of the phase angle existing between the fundamental frequency of the feeding network voltage and the fundamental frequency of the feeding network current. Generally, one tries to make the network-side power factor of a converter fed from an a.c. voltage network as great as possible, thereby keeping the reactive power requirement of the converter to a minimum. Additionally, one also tries at the same time to reduce the voltage load of the valves at constant transmission efficiency. In other words, at a given input voltage the transmitted power should be as great as possible at any degree of modulation.

The object of the present invention is to increase the power transmitted from the m converters to the load in the above-mentioned circuit arrangement.

SUMMARY OF THE INVENTION

The invention is based on the realization that improved power transmission is possible when, in the above circuit arrangement, the ratio of the effective value of the fundamental frequency of the output converter voltage to the effective value of the feeding network voltage is increased. This applies both when the feeding network voltage is a d.c. voltage, supplied, for example, by a rectifier, a battery, or a d.c. voltage network, and each of the converters is an inverter, and also when the feeding network voltage is an a.c. voltage, supplied, for example, by an inverter, a generator, or an a.c. voltage network, and each converter is a direct converter or an intermediate link converter.

According to the invention, this ratio can be increased at a fixed effective value of the feeding network voltage by increasing the effective value of the fundamental frequency of the output voltage. The increase of this ratio can be achieved also, according to the invention, at fixed effective value of the fundamental frequency of the output voltage, by reducing the effective value of the feeding network voltage. This then leads to a reduction of the voltage load of the valves and to a reduction of the rated power of the network-side transformer — if one if present. According to the invention, a combination of the above two techniques is also possible.

More particularly, in accordance with the invention, the above-mentioned circuit arrangement is modified so as to provide a control voltage to the control unit of at least one of the m converters which is such that the output voltage of the converter has a periodic waveform which, includes, in addition to the Y-voltage corresponding to the given conductor voltage at the load, at least one harmonic of an odd-numbered order divisible by m.

If, as usual, the conductor voltages at the load have substantially a sinusoidal waveform, the control voltage provided will be such that the output voltage of the aforesaid converter has at least one harmonic of third order.

By providing such a control voltage the output voltage of the converter is deformed in relation to a purely sinusoidal waveform and has a "compressed" amplitude. Since the output-side converter conductor currents of the order 3, 9, 15 . . . cannot flow in the absence of a connection between the neutral of the load and the neutral of the converter outputs, the "compressed" output voltage of the converter appears substantially also at the outputs of the other (m-1) converters.

Analysis of the aforesaid "compressed" type of output voltage shows that, when the amplitude of its fundamental frequency is to be equal in amount to the amplitude of an output voltage having a purely sinusoidal waveform, a lower input voltage is required at the converter for delivering an equal amount of fundamental frequency power at the load, than in the case of a purely sinusoidal output voltage. This is true at any degree of modulation of the converters of the circuit arrangement. A lower input voltage means a lower voltage drain for the valves of the converters. Moreover, if the input voltage is being derived from a transformer, an additional advantage arises in that the valve side (converter side) of the transformer may be designed for lower voltage. Hence, a transformer of lower rated power may be used.

The aforesaid analysis of the "compressed" output voltage shows further than when the input voltage of the circuit arrangement is fixed and cannot be altered, the fundamental frequency of this "compressed" output voltage will be greater in amount than the amplitude of an output voltage produced by the same converter having a purely sinusoidal waveform. Since, for example, in rotating field machines only the fundamental frequency of the output voltage is of importance for the power transmission, there thus results for an unchanged input voltage, an increase in transmitted power.

In order to further increase the ratio of the effective value of the fundamental frequency of the voltage to the effective value of the feeding network voltage in all converters, the control voltage provided may be such that the output voltage of the one converter comprises essentially no harmonics of odd order not divisible by 3. In general, however, for practical situations, the control voltage will be such that the output voltage satisfies the less strict requirement of including one odd-numbered harmonic divisible by 3. In such case, the control voltage and output voltage will generally have trapezoidal waveforms. In particular, the trapezoidal form should be selected so that the output voltage is symmetrical and rises, per half-cycle, approximately linearly between 0° and (37.5° ± 5°), is substantially constant between (37.5° ± 5°) and (142.5° ± 5°), and falls approximately linearly between (142.5° ± 5°) and 180°. The deviation from the described desired trapezoidal waveform should, therefore, not exceed a permissible error of about +5°, preferably of +2°, at any angle.

According to a first embodiment of the invention, the circuit arrangement includes for the one converter, a control arrangement for the controlling of its output voltage, and for the remaining (m-1) converters, respectively, (m-1) current control loops for regulating their load-side conductor currents. In the aforesaid current control loops nominal current values are provided which correspond to the desired current curve occuring in the output conductors of the converters due to given conductor voltages.

In the aforesaid embodiment, a nominal current of a sinusoidal waveform may, preferably, be provided in the current control loops. This nominal current may either be sinusoidal in each cycle or be comprised per cycle, of two positive or two negative half-vibrations. In principle, a nominal current of triangular waveform may also be used as e.g., in the case of an ohmic load.

Also in this first embodiment, the control voltage of the aforementioned one converter takes on a trapezoidal waveform; and, in particular, one which includes no harmonics of odd order not divisible by 3. To adjust the phase of the output voltage of the converter, this first embodiment provides that the control voltage for such converter be derived from the Y-voltage present between the neutral of the load and the load-connected output conductor of the converter. If desired, the conductor voltage can be obtained from the Y-voltage after stepdown by means of a voltage transformer. Alternatively, the aforesaid Y-voltage may be tapped and supplied to the control arrangement in such a way that the zero crossings in the waveform of the resultant output voltage of the converter coincide with the zero crossings in the waveform of Y-voltage.

To obtain the trapezoidal control voltage, an amplifier stage is provided for receiving the Y-voltage. Specifically, the gain and the limiting effect of the amplifier stage are controlled as a function of the crest value of at least one of the Y-voltages to thereby generate the trapezoidal control signal which is then fed to the control unit of the converter. In this case, the amplifier stage includes a series circuit comprising a multiplier member and a limiting operational amplifier, one input of the multiplier member and the limiting input of the operational amplifier being energized, via a rectifier and a smoothing member, with the respective Y-voltage.

In particular, the above amplifier stage is designed so that its delivers a control voltage whose waveform corresponds in each half-cycle substantially to a sinusoidal waveform cut off between 37.5° and 142.5°, and whose fundamental frequency has the same amplitude as the voltage fed to the amplifier stage. One then obtains a control voltage which contains no third and fifth order harmonics and contains seventh order harmonics only to a negligible extent.

If the operation of the converter must meet higher dynamic requirements, the embodiment is further provided with a voltage control loop for regulating the difference voltage which prevails between the neutral at the load-side output of the converter, on the one hand, and the neutral of the load, on the other. The function of this voltage control loop is to regulate the difference voltage to a given value, preferably zero. This voltage control loop may include a voltage regulator having a comparator which is fed, on the one hand, with the difference voltage and, on the other hand, with a nominal value, and whose output is connected to an addition member which influences the control voltage. The voltage regulator may, more particularly, be one with integral action. It then acts simultaneously as a regulator and as timing member. It may further be provided that the addition member is energized, on the one hand, by the output voltage of the voltage regulator and, on the other, by the Y-voltage, after the rectification and smoothing thereof. The addition member may further be connected on the output side to the setting inputs for the gain and limitation of the amplifier stage.

For most applications, the time constant of the voltage control loop should be large in relation to the cycle duration of the third harmonic of the output voltage of the converter. The adjustment of the time constant can be carried out simply by employing a regulator with integral action. In such case, the nominal value of the difference voltage may be made zero.

According to a second embodiment of the invention, a voltage control loop is provided for the one converter which comprises a voltage regulator having a comparator which is fed, on the one hand, with the output voltage of the converter, and, on the other hand, with a trapezoidal nominal voltage value, and which has its output connected to the input of the converter control unit.

An especially simple way of deriving the aforesaid trapezoidal nominal voltage value is to provide as a nominal voltage the Y-voltage between the neutral of the load and the load-connected output conductor of the converter. Alternatively, the Y-voltage of the converter may be tapped and supplied to a nominal value generator which delivers a nominal voltage value in such a way that the zero crossings in the waveform of the output voltage of the converter coincide with the zero crossings in the waveform of the Y-voltage. In this manner, the phase of the output voltage of the converter is also fixed. A particular nominal value generator may comprise an amplifier stage which receives the aforesaid Y-voltage and which has a gain and a limiting effect which are controlled as a function of the crest value of at least one of the Y-voltages at the load. The output voltage of the amplifier stage in this case serves as the nominal voltage value. Instead of the crest value, the mean value or the effective value of this tapped Y-voltage or a mean value from all Y-voltages may be used. In either case, one obtains a trapezoidal nominal voltage resulting from the sinusoidal waveform by cutting off a portion of the amplitude.

According to a third embodiment of the invention, the circuit arrangement includes voltage control arrangements for controlling the output voltages of the $m$ converters so that they contain no harmonics of the fifth and seventh order. In this embodiment, all $m$ output voltages have deformed sinusoidal waveforms.

More particularly, in this embodiment, each control voltage is obtained from one of the $m$ output voltages of a control or regulating device by superposition of such voltage with an additional voltage. This additional voltage, for example, may include one or several voltage components whose frequency or frequencies are an odd multiple, divisible by 3, of the fundamental frequency of the output converter voltages. That is, only harmonics of the third, ninth, ... order are included in the additional voltage. These harmonics cause the desired deformation of the converter output voltages. However, since the converters are Y-connected on the output side, and there is no connection between the neutral of the load and the neutral of the converters, these harmonics do not appear at the load.

In a particular described arrangement of this third embodiment, the additional voltage is derived from one of the $m$ output voltages of the control or regulating device by frequency multiplication. Specifically, the particular output voltage of the control or regulating device is applied to frequency multiplier with a multiplication factor $n$, the latter factor $n$ being 3 or a multiple thereof. This frequency multiplier is connected to one input of a multiplying member, whose other input is energized by a multiplication signal. The output of the multiplying member, in turn, is connected to the second input of $m$ addition or adding members which precede the converter control units and are energized at their first inputs with different ones of the output voltages of the regulating device.

The multiplication signal may be constant or may be controlled as a function of other parameters. Also, at the same time, several stages of a different multiplication factor $n$, each comprising a frequency multiplier and a following multiplying member may be provided. In this case, these stages may be connected to a common addition stage whose output is connected with every second input of the $m$ addition members.

According to yet another embodiment, the converter control voltages are obtained from the output voltages of the control and regulating device by other means. In this case, the control or regulating device develops three output voltages of sinusoidal waveform, offset relative to each other by 120°. According to this embodiment, each control voltage is obtained from one of the three output voltages of the control or regulating device by applying the output voltage to the signal input of an amplifier stage and controlling the gain and limitating effect of the stage as a function of the crest value of the output voltage.

In this embodiment, the amplifier stage comprises a series connection of a multiplying member and a limiting operational amplifier, one input of the operation amplifier being energized, via a rectifier and a smoothing member, by at least one of the output voltages of the control or regulating device. Moreover, each amplifier stage is designed so that it delivers a control voltage whose waveform in each half-cycle corresponds essentially to a sinusoidal function which is cut off between 37.5° and 142.5° and which has a fundamental frequency whose amplitude is the same as the output voltage fed to the amplifier stage.

BRIEF DESCRIPTION OF THE DRAWING

Specific embodiments of the invention will be explained more fully in the following detailed description which makes reference to the accompanying drawings, in which.

DETAILED DESCRIPTION

It should be noted that similar or analagous elements have been given the same reference numerals in all the drawings.

Figures 1, 2:
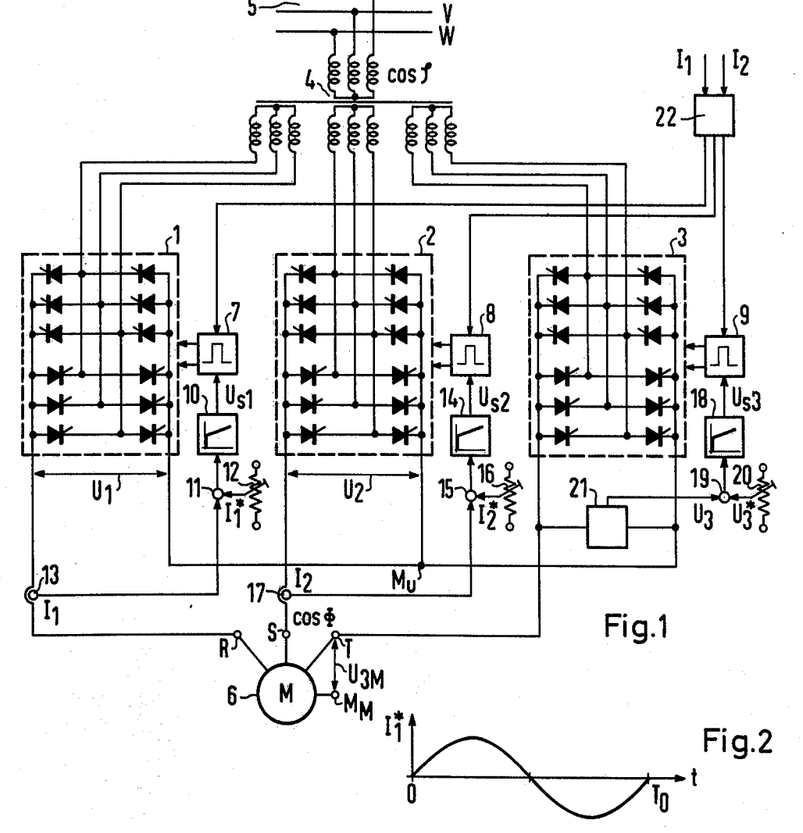
FIG. 1 shows a circuit arrangement according to a first embodiment of the invention.
FIGS. 2 and 3 show waveform diagrams for particular currents in the arrangement of FIG. 1.

The circuit arrangment of FIG. 1 comprises three converters 1, 2, and 3 which are connected, via a transformer 4 having three separate secondary windings, to a three-phase a.c. voltage network 5 having the phase conductors U, V, W. Converters 1, 2, and 3 are direct converters adapted for operation in both energy directions. Each converter comprises two anti-parallel partial current converters each of which includes controllable valves arranged in three-phase a.c. bridge connection. The controllable valves employed might, typically, be thyristors. One output conductor of the converters 1, 2 and 3 is connected to a common neutral $M_U$. The other output conductor is connected with one of the terminals R, S, T of a three-phase symmetrical load 6, e.g., a rotary field machine of either the synchronous or asynchronous type. As shown the windings of the rotary field machine are in a Y-connection, although a delta connection may also be used. The neutral $M_M$ of load 6 is shown as having been brought out and, advantageously, is not connected with the output-side neutral $M_U$ of the three converters 1, 2 and 3.

This eliminates the need for a fourth slip ring, if a rotary field machine is fed by rotor, as well as for a connecting bar between the two neutrals $M_U$ and $M_M$.

Associated with the converters 1, 2, and 3 are control units 7, 8 and 9 respectively, each of which operates linearly. The control units 7, 8 and 9 function to supply the controllable valves of their respective converters 1, 2 and 3 with ignition pulses in response to the periodic voltages $U_{s1}$, $U_{s2}$, $U_{s3}$, respectively, the latter voltages having given control angles and operating in a fixed order. The control units 7, 8 and 9 are each part of a control loop. Associated with each of the first and second converters 1, 2 is a current control loop for regulating their respective load-side conductor currents $I_1$, $I_2$, while associated with the third converter 3 is a voltage control loop provided for regulating its output voltage $U_3$.

The control voltage $U_{s1}$ for control unit 7 is supplied by a current regulator 10, whose preconnected comparator 11 compares the actual value $I_1$ of the load-side conductor current with a nominal current value $I^*_1$. The nominal current value $I^*_1$ is supplied to the compatator 11 by a nominal value current generator 12, shown in FIG. 1 as a potentiometer, and has a sinusoidal waveform. The actual value $I_1$ is likewise sinusoidal and is supplied to the comparator 11 by a current transformer 13, the latter being arranged in the respective output conductor of converter 1 connected to the terminal R.

A correspondingly constructed current control loop for regulating the load-side conductor current $I_2$ is associated with the second converter 2. In this current control loop, the control voltage $U_{s2}$ for the control unit 8 is supplied by a current regulator 14. The latter is preceded by a comparator 15 which compares the actual value $I_2$ of the load-side conductor current with a nominal current value $I^*_2$. The nominal current value $I^*_2$ is provided by a nominal value current generator 16, also shown as a potentiometer, and the nominal current value again has a sinusoidal waveform. The actual value $I_2$ of the output-side conductor current is developed by a current transformer 17. The latter, in turn, is arranged in the respective output conductor of the second converter 2 connected with the tereminal S.

The control voltage $U_{s3}$ for controlling the control unit 9 feeding the third converter is supplied by a circuit arrangement which comprises a voltage regulator 18. The voltage regulator 18 receives the output of a comparator 19 which is energized by the actual value $U_3$ of the output voltage of the third converter 3 and by a nominal voltage $U^*_3$ which has a trapezoidal waveform. The nominal voltage $U^*_3$ is supplied to the comparator 19 by a nominal value voltage generator 20, the latter being schematically represented in FIG. 1 as a potentiometer. The actual value $U_3$ of the output voltage is supplied to comparator 19 from a tap 21, i.e., from a voltage transformer, arranged between the two conductors of the third converter 3.

The control voltages $U_{s3}$ delivered by the voltage regulator 18 to the control unit 9 has a periodic waveform. Since the control units 7, 8, 9 are assumed to be linear, the output voltages $U_3$ of the third converter 3 has the same waveform as the control voltages $U_{s3}$.

Figure 3:
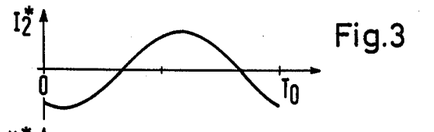
Figure 4:
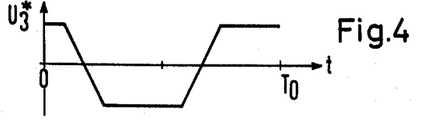
FIG. 4 shows a waveform diagram for a particular voltage in the arrangement of FIG. 1.

In FIGS. 2–4 the curve of the nominal values $I^*_1$, $I^*_2$, and $U^*_3$, respectively, are plotted as a function of time $t$. In these curves the time $T_o$ represents one cycle of duration. As can be seen from the three curves and as above-mentioned, the nominal current values $I^*_1$ and $I^*_2$ have a sinusoidal waveform, while the nominal voltage value $U^*_3$ has a trapezoidal waveform which is phase-shifted relative to the current waveforms and has positive and negative voltage-time areas. As can also be seen, the voltage of $U^*_3$ has a constant or level portion which extends over a range of about 105 electrical degrees and rising and falling slopes which are essentially linear. It is also evident that the nominal current values $I^*_1$, $I^*_2$ are phase- or time-shifted in relation to each other by the angle of 120° or by the time $T_o/3$. The above-indicated time shift of the nominal voltage $U^*_3$ depends on the inductance of the load 6 and, if the load 6 is purely ohmic, also amounts to 120 electrical degrees.

As shown in FIG. 1, the control units 7, 8, 9 are associated with a command stage 22 which is fed with the actual current values $I_1$ and $I_2$. The actual values $I_1$ and $I_2$ may be supplied by the current transformers 13, 17. For each control unit 7, 8, 9, the command stage 22 generates a signal which indicates whether pulses are to be released for one or the other of the two partial current converters. For a positive conductor current $I_1$ or $I_2$ the positive partial current converters associated with the currents are released. In FIG. 1 these are the upper parts of converters 1 and 2. For the third converter 3, the procedure is analogous, i.e. a positive output conductor current $I_3$ releases the positive partial current converter of converter 3. In the latter case, the current $I_3$ is formed from the actual values $I_1$, $I_2$ of the two other converters 1, 2. In particular, the signal $I_3$ is formed by the command stage 22 by using the actual values $I_1$ and $I_2$ to solve for $I_3$ in the relationship stating that the sum of all conductor currents $I_1$, $I_2$ and $I_3$ is zero.

Compared with a circuit arrangement in which the third converter 3 is associated with a current control loop and where the neutral points $M_U$ and $M_M$ are connected together, the circuit arrangement according to FIG. 1, when using a trapezoidal nominal voltage value $U^*_3$, permits the secondary voltage of transformer 4 to be smaller — assuming equal output effective power. The required rated power of transformer 4, which depends on the crest value of the supplied voltage, is thereby reduced, as is also the voltage load on the valves of the three converters 1, 2, and 3. Moreover, the network-side power factor cos$\Phi$ is also increased particularly at low modulation of the three converters 1, 2, and 3.

The regulation provided by the circuit arrangement of FIG. 1 will now be explained. In two output phases of the circuit, the conductor currents $I_1$ and $I_2$ are controlled so as to take on sinusoidal waveforms. In the third output phase, the conductor current $I_3$ flows freely. The latter current obeys the condition that the sum of the instantaneous values of all conductor currents $I_1$, $I_2$ and $I_3$ is zero at all times. This condition is based on the fact that the neutral $M_M$ of load 6 is not connected with the neutral $M_U$. Therefore, the conductor current $I_3$ necessarily also has a sinusoidal waveform, and, hence, the conductor currents $I_1$, $I_2$ and $I_3$ are symmetrical. In the third output phase, the output voltage $U_3$ is controlled so as to take on a trapezoidal waveform. By the selection of the circuit arrangement and by the sinusoidal current control, it is ensured that no harmonics occur in the conductor currents $I_1$, $I_2$ and $I_3$. This means that the linked output voltages between the terminal R, S, T are in every case sinusoidal. Accordingly, the output voltages $U_1$ and $U_2$ of the two converters 1, 2 will also be trapezoidal. This means that the harmonics of the regulated output voltage $U_3$ will occur in equal magnitude in the other two output voltages $U_1$ and $U_2$.

In the ideal case, the output voltage $U_3$ of the third converter 3 is regulated so that it comprises pronounced harmonics of the third and ninth order, but no harmonics of an odd-numbered order not divisible by 3. In other words, only harmonics of the 3rd, 9th, 15th . . . order are present. Moreover, the amplitudes of the harmonics of 3rd and 9th order are selected so that, at given fundamental frequency, the maximum values of the output voltage $U_3$ are as small as possible. This, in turn, means that the nominal voltage value $U_3$ in FIG. 4 will have, at the given fundamental frequency, a maximum level which is as low as possible. In this ideal case, a symmetrical, undistorted three-phase output system $U_1$, $U_2$, $U_3$ of trapezoidal form thus occurs.

In comparison to the above-discussed ideal case, however, a small component of fifth and seventh order harmonic in the regulated output voltage $U_3$ is also acceptable. Since no current harmonics can flow because of the sinusoidal current regulation of the converters 1 and 2, these other two harmonics will occur in the same magnitude and phase position in the other two output voltages $U_1$ and $U_2$. They thus constitute a smaller increase of the voltage load on the valves of the converters 1, 2, 3 in comparison to the above-mentioned ideal case.

In practice, the aforesaid type of voltage form (i.e., one which includes fifth and seventh order harmonics) can be obtained by providing as nominal value generator 20 an amplifier stage, to which a sinusoidal voltage is fed. The gain and limitation of this amplifier stage are then set as a function of the crest value of the supplied sinusoidal voltage. Thereby, a trapezoidal nominal voltage value $U_3$ is obtained which results from the amplifier's cutting off a portion of the amplified sinusoidal voltage amplitude. The use of such an amplifier stage will be discussed further in reference to the embodiments of FIGS. 7 and 10.

As can be appreciated, with a trapezoidal form of the output voltage $U_3$, the third converter 3 is modulated higher in the mean over a longer period of time than with the usual sinusoidal voltage control. As a result, in comparison to an arrangement using the latter type of control, the present arrangement results in a current on the network side having a reduced harmonic content.

Due to the current regulation in two output phases, the conductor current in the third output phase can form freely, as has been pointed out above. There is, therefore, no rigid coupling of the two current control loops via the load 6. The same applies for the voltage control loop. There is thus no rigid coupling of the three output voltages $U_1$, $U_2$, $U_3$. The current control system is, therefore, largely independent of the voltage control system, and vice versa.

With a voltage regulation in all three output phases, minor asymmetries in the output voltages $U_1$, $U_2$, $U_3$ would result in high current errors, the magnitude of which would be determined by the ratio of the voltage deviation to the reactances in the load circuit. In the latter case, even small d.c. voltage components cause significant disturbances, since the conductor direct currents which occur are limited only by the ohmic resistances of the load 6. Because the elimination of such errors requires smoothing of the measured actual voltage value, either loss of time in the voltage regulation or higher cost of control engineering results. With the present circuit arrangement, however, where the current regulation and the voltage regulation are independent of each other, these disadvantages are avoided.

Figure 5:
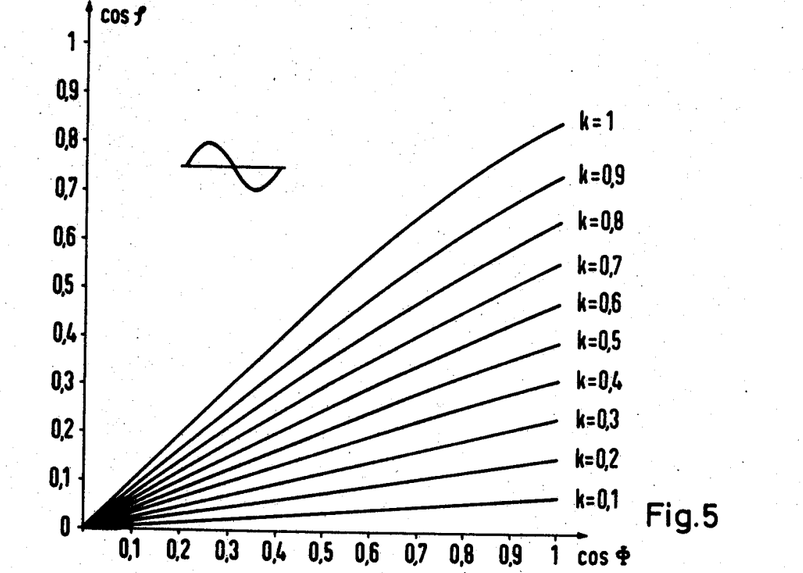
FIGS. 5 and 6 illustrate diagrams of the network-side power factor as a function of the load-side power factor for different degrees and types of modulation of the converters of FIG. 1.
Figure 6:
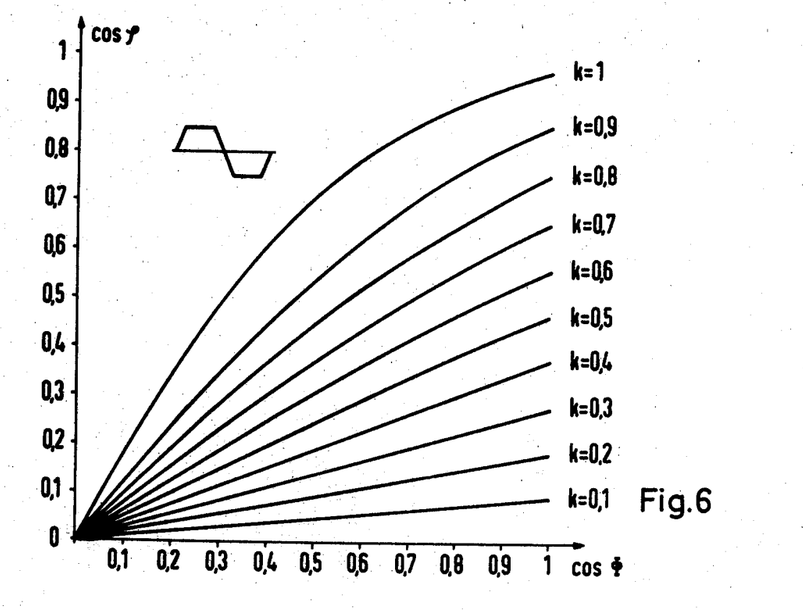

In FIGS. 5 and 6, the network-side power factor $\cos\Phi$ is plotted as a function of the load-side power factor $\cos\phi$ for different degrees of modulation $k$ of the three converters 1, 2, and 3. FIG. 5 relates to control of the third converter 3 with a sinusoidal, and FIG. 6 with a trapezoidal output voltage $U_3$. A comparison of the two figures shows that, for any degree of modulation $k$, at a given loadside power factor $\cos\phi$, the network-side power factor $\cos\Phi$ is greater, i.e. better, with the trapezoidal output voltage $U_3$ (FIG. 6) than with sinusoidal output voltage $U_3$ (FIG. 5). This holds true for small as well as large degrees of modulation $k$. The reactive power requirement of the circuit arrangement, therefore, is reduced by the use of trapezoidal voltage control. A closer examination of FIG. 6 shows, moreover, that at a high degree of modulation, e.g., for $k=0.9$ and $k=1.0$, the network-side power factor cos    is greater than the loadside power factor $\cos\phi$. This property can be of considerable importance for some applications.

Figure 7:
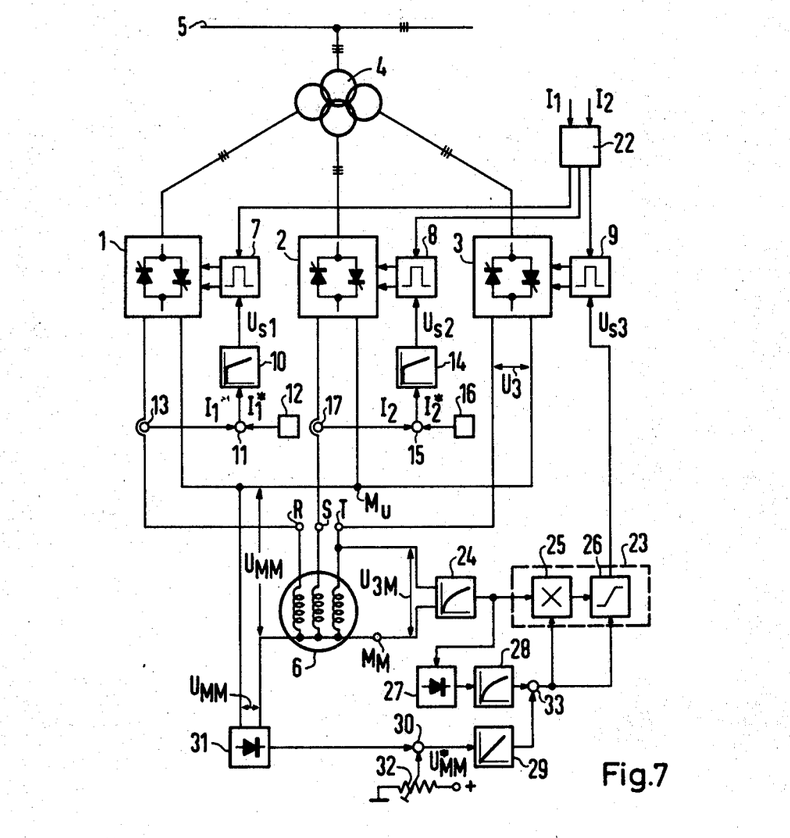
FIG. 7 shows a circuit arrangement according to a second embodiment of the invention.

In FIG. 7 is shown another circuit arrangement in accord with the invention comprising three converters 1, 2, and 3, which again are connected to an a.c. voltage network 5, via a transformer 4. The aforesaid converters are also again shown as direct converters. On the load side, the converters 1, 2, and 3 are Y-connected at a neutral $M_U$. One output conductor of each is connected with one of the respective terminals R, S, T of a load 6 whose neutral is marked $M_M$. The two neutrals $M_M$ and $M_U$ are not interconnected. The switching of the partial current converters comprising converters 1, 2 and 3 is brought about by a command stage 22 which is controlled by the conductor currents $I_1$ and $I_2$.

Associated with the first and second converters 1, 2 are again current control loops for regulating the load-side conductor currents $I_1$ and $I_2$. These current control loops correspond to those already described in FIG. 1, so that a further explanation of their configuration and operation is not believed necessary. The nominal current values $I^*_1$ and $I^*_2$ again have the sinusoidal waveforms shown in FIGS. 2 and 3, respectively.

For the third converter 3, a control arrangement is provided for controlling its output voltage $U_3$ so it takes the form of a periodic, trapezoidal waveform. This control arrangement supplies a trapezoidal control voltage $U_{s3}$ as shown in FIG. 4 to the control unit 9.

The aforesaid control arrangement comprises an amplifier stage 23 which is fed, via a smoothing member 24, the Y-voltage $U_{3M}$ of the load 6. The latter voltage appears between the neutral $M_M$ of the load and the output conductor of the third converter 3 connected to such load. If load 6 does not possess a natural or accessible neutral $M_M$, one is artificially created in known manner by connecting a Y-connection of impedances. The amplifier stage 23 has the function of delivering a trapezoidal control voltage $U_{s3}$ to the control unit 9 in such a way that the zero crossings in the waveform of the output voltage $U_3$ coincide with the zero crossings in the waveform of the Y-voltage $U_{3M}$. The zero crossings of the Y-voltage $U_{3M}$, therefore, fix the phase position of the trapezoidal control voltage $U_{s3}$.

In the present case, the amplier stage 23 has been constructed so that it forms the trapezoidal control voltage $U_{s3}$ itself. For this purpose, the smoothed Y-voltage $U_{3M}$ is supplied to the signal input of the amplifier stage 23. In addition, the gain and limiting effect or characteristic of the amplifier stage 23 are set as a function of the crest value of the smoothed Y-voltage $U_{3M}$ or of all three smoothed Y-voltages.

As shown, the amplifier stage 23 comprises a series connection of a multiplying member 25 and a limiting operational amplifier 26. These elements may be arranged in any order. The input of the multiplying member 25 is energized via a rectifier 27 which has an after-connected smoothing member 28 and which receives the Y-voltage $U_{3M}$ after smoothing in member 24. Similarly, the limiting input of the operational amplifier 26 is energized via the same rectifier and smoothing member combination. The amplifier stage 23 is designed so that it delivers a control voltage $U_{s3}$ whose waveform corresponds in each half-cycle essentially to a sine function cut off between 37.5° and 142.5°. The fundamental frequency of the output voltage of the amplifier stage 23 has the same amplitude as the input voltage fed to it from the smoothing member 24. In the stated range from 37.5° to 142.5°, the amplitude of the control voltage is essentially constant. Just how the control voltage $U_{s3}$ is formed from the Y-voltage $U_{3M}$ will be explained fully with reference to FIG. 8.

Figure 8:
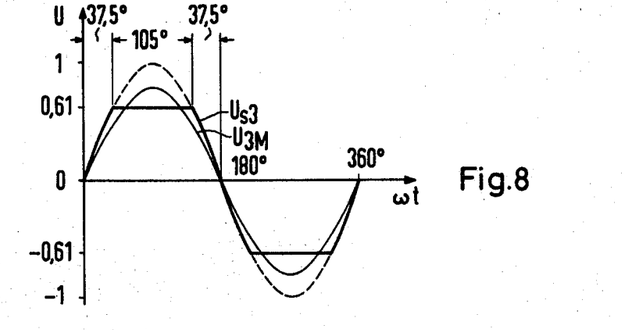
FIG. 8 shows a waveform diagram illustrating how the control voltage for the third converter of FIG. 7 is obtained from the Y-voltage at the load.

FIG. 8 shows the curve of a full cycle of the different voltages as a function of the time $t$ or of the phase angle wt. The smoothed Y-voltage $U_{3M}$, which is substantially sinusoidal, is amplified by the amplifier stage 23, so that, neglecting the limiting effect of the amplifier, its output voltage has the form shown by the broken line curve. The limiting by the operational amplifier 26, however, causes the output voltage in the positive and negative range to be cut off at an amplitude level 0.61, assuming the unlimited amplitude to be 1. One thus obtains, as the control voltage $U_{s3}$, the symmetrical output voltage shown in solid line which, per half-cycle, rises approximately linearly between 0° and 37.5°, remains essentially constant between 37.5° and 142.5°, and falls approximately linearly between 142.5° and 180°. The voltage $U_{s3}$ is, therefore, a cutoff or "compressed" sine wave whose platform or constant amplitude width is 105°. Moreover, adjusting the gain and limiting characteristic of amplifier 26 proportionally to the Y-voltage $U_{3M}$, ensures that the stated angles are not significantly, changed when the level of the Y voltage $U_{3M}$ changes. Thus, the described trapezoidal form of the voltage $U_{s3}$ is always preserved.

As can be appreciated, the cut-off or "compressed" sine wave of FIG. 8 has the property that it possesses no harmonic of fifth order and only a negligible harmonic of seventh order. The ratio of the seventh order harmonic to the fundamental frequency is about 1%. The latter frequency, moreover, is about 15% above the crest value of 0.61.

For low dynamic requirements, the control arrangement 7 is fully sufficient. For higher requirements, however, it is advantageous to provide a voltage control loop which regulates the difference voltage $U_{MM}$ existing between the neutral $M_U$ at the loadside output of the converters 1, 2 and 3, on the one hand, and the natural or artificial neutral $M_M$ of load 6, on the other.

In FIG. 7 such a voltage control loop is illustrated. As shown, it includes a voltage regulator 29 which is coupled to a comparator 30. The comparator 30 is fed by the difference voltage $U_{MM}$ after it has been rectified by a rectifier 31, and by a nominal value $U*_{MM}$ furnished by a nominal value generator 32. The output of the voltage regulator 29 is connected to one input of an addition or adding member 33, the latter member being used to influence the control arrangement 23 in its generation of the control voltage $U_{s3}$. The other input of the member 33 is connected to the output of the smoothing member 28. The output of member 33, in turn, is connected with the amplifying and limiting inputs of the amplifier stage 23. The voltage regulator 29, preferable, should be a regulator with integral action, e.g., a PI controller or a pure integral regulator, which besides acting as a regulator also acts as a time member or integrator. In such case, the time constant of the voltage regulator 29 and, hence that of the voltage control loop is selected to be large in relation to the cycle duration of the harmonic of third order which occurs in the difference voltage $U_{MM}$. Instead of a regulator with integral action, however, a more conventional regulator may be employed for regulator 29 and a filter used to eliminate the third harmonic.

The nominal value $U*_{MM}$ being applied to comparator 30 may be chosen to be zero, so that the voltage control loop causes the fundamental frequency of the difference voltage $U_{MM}$ to be controlled to zero. As long as the fundamental frequency of the difference voltage $U_{MM}$ is not equal to zero, the voltage control loop causes a correction factor to be delivered to the addition member 38. In such case, the gain and limiting effect of the amplifier stage 23 are varied, resulting in a modification of the amplitudes shown in FIG. 8. In particular, the amplitude of the control voltage $U_{s3}$ is varied, retaining the entered angles, until the neutrals $M_M$ and $M_U$ are on the same potential.

Figure 9:
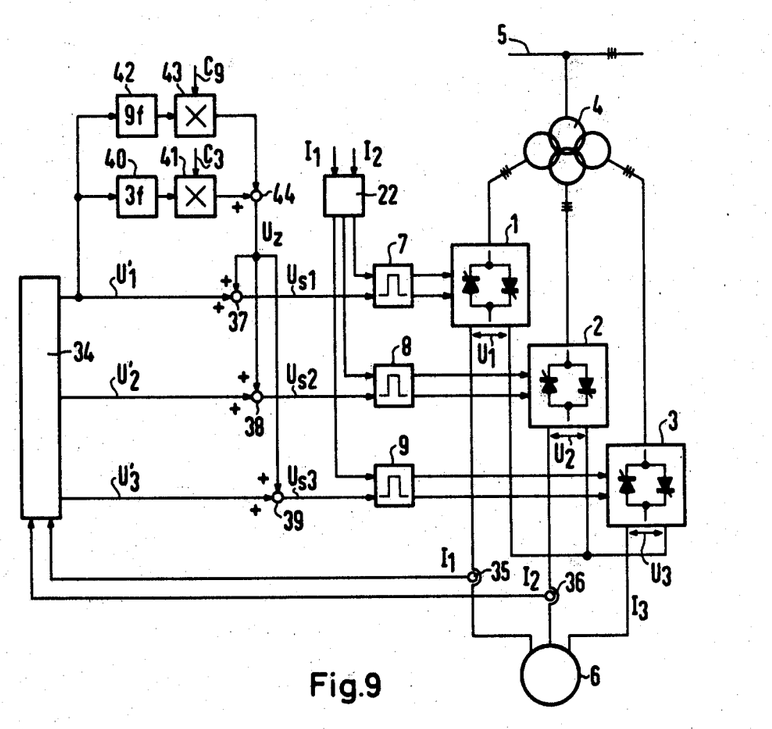
FIG. 9 illustrates a third embodiment of a circuit arrangement in accord with the invention.

In FIG. 9 is shown another circuit arrangement in accord with the invention comprising three converters 1, 2, 3 which again are connected, via a transformer 4, to an a.c. voltage network 5 and which again feed a load 6. A command stage 22 is provided for the switching of the individual partial current transformers included in each converter. Again control voltages $U_{s1}$, $U_{s2}$, $U_{s3}$ are developed for controlling the control units 7, 8, 9 of all three converters 1, 2, 3 in such a way that the output voltages $U_1$, $U_2$, $U_3$ of these converters have a periodic waveform and contain essentially no harmonics of the 5th and 7th order. This control results in conductor currents $I_1$, $I_2$ and $I_3$ having sinusoidal waveforms.

As shown in FIG. 9, a control or regulating device 34 is provided which generates three periodic output voltages $U'_1$, $U'_2$ and $U'_3$ which normally are supplied to the respective control units 7, 8, 9 directly as control signals. The control or regulating device 34 may be, in particular, a control circuit functioning on the principle of transvector regulation (for an illustration of such a circuit see Siemens-Zeitschrift 45 (1971), pages 757 to 760) and is fed by two current transformers 35, 36, with the actual values of the conductor currents $I_1$, $I_2$. Assuming linear operation for the control units 7, 8, 9, the three output voltages $U'_1$, $U'_2$ and $U'_3$ delivered by the control or regulating device 34 are sinusoidal in stationary operation and offset by 120 electrical degrees relative to each other. When using other control units 7, 8, 9 customary in prior art, the control or regulating device 34 is constructed so that the time-shifted output voltages $U'_1$, $U'_2$ and $U'_3$ can be described by the function $c$ [arc sin ($k$sin wt)], $t$ being time, $w$ the angular frequency, and $c$ and $k$ constants.

Each control voltage $U_{s1}$, $U_{s2}$, $U_{s3}$, is obtained from one of the three output voltages $U'_1$, $U'_2$, $U'_3$ by superposition of an additional voltage $U_z$. For the voltage superposition, three addition or adder members 37, 38, 39 are provided. The members 37, 38, 39 are connected ahead of the control units 7, 8, 9, respectively. Each has a first input energized by one of the output voltages $U'_1$, $U'_2$ and $U'_3$ and second input energized by the additional voltage $U_z$.

In the present illustrative case, the additional voltage $U_z$ comprises only two voltage components. The frequency of these two voltage components is three times the fundamental frequency of the output voltages $U'_1$, $U'_2$ and $U'_3$. The additional voltage $U_z$, therefore, comprises voltage components whose frequencies are odd multiples, divisible by 3, of the fundamental frequency. As shown, the additional voltage $U_z$ is derived from the output voltage $U'_1$ by frequency multiplication. To achieve such multiplication, two stages are provided. These stages comprise frequency multipliers 40, 42, respectively, which have respective multiplication factors n=3 and n=9 and respective after-connected multiplying members 41, 43. The output voltage $U'_1$ is supplied to both stages. By means of the frequency multipliers 40, 42, the third or ninth harmonic is formed. The latter is then multiplied in the multiplying members 41, 43 by a constants or controlled multiplication signals $C_n = C_3$ or $C_n = C_9$. To adjust the multiplication signals $C_n$, potentiometer (not shown) may be provided. The gain factors of the multiplying members 41, 43, which members comprise conventional multipliers, are less than 1. The multiplication signals $C_3$ and $C_9$ must be selected so that the addition in addition stage 44 produces a voltage $U_z$ which when added to the control voltages $U'_1$, $U'_2$, $U'_3$ produces three control voltages $U_{s1}$, $U_{s2}$, $U_{s3}$, displaced by 120 electrical degrees, which modulate the respective converters 1, 2, 3 such that output voltages $U_1$, $U_2$, $U_3$ result which have waveforms which match the curve $U_{s3}$ shown in FIG. 8 as closely as possible.

Again assuming linearly operating control units, the three voltages $U'_1$, $U'_2$, $U'_3$ supplied by the control device 34 are sinusoidal and offset relative to each other by 120°. Hence, in this case, the harmonics supplied to the adding stage 44 are also sinusoidal. Since, in a three-phase symmetrical a.c. voltage system, the harmonics of an order divisible by 3 have the same phase position in all three phases, proper adjustment of the multiplication factors $C_3$ and $C_9$ results in three control voltages $U_{s1}$, $U_{s2}$, and $u_{s3}$ which are offset by 120° trapezoidal waveforms which correspond to the curve $U_{s3}$ in FIG. 8.

With the linear operation of the control units 7, 8 and 9, one thus obtains the same trapezoidal waveform for all three output voltages $U_1$, $U_2$ and $U_3$ of the converters 1, 2, and 3. In the linked output voltages, the additionally introduced harmonics of an order divisible by 3 cancel each other out. Hence, the desired state of operation of the load 6 with trapezoidal output voltages $U_1$, $U_2$, $U_3$ for each converter 1, 2, 3 and with sinusoidal conductor currents $I_1$, $I_2$ and $I_3$, as well as, with sinusoidal linked voltages is achieved.

Figure 10:
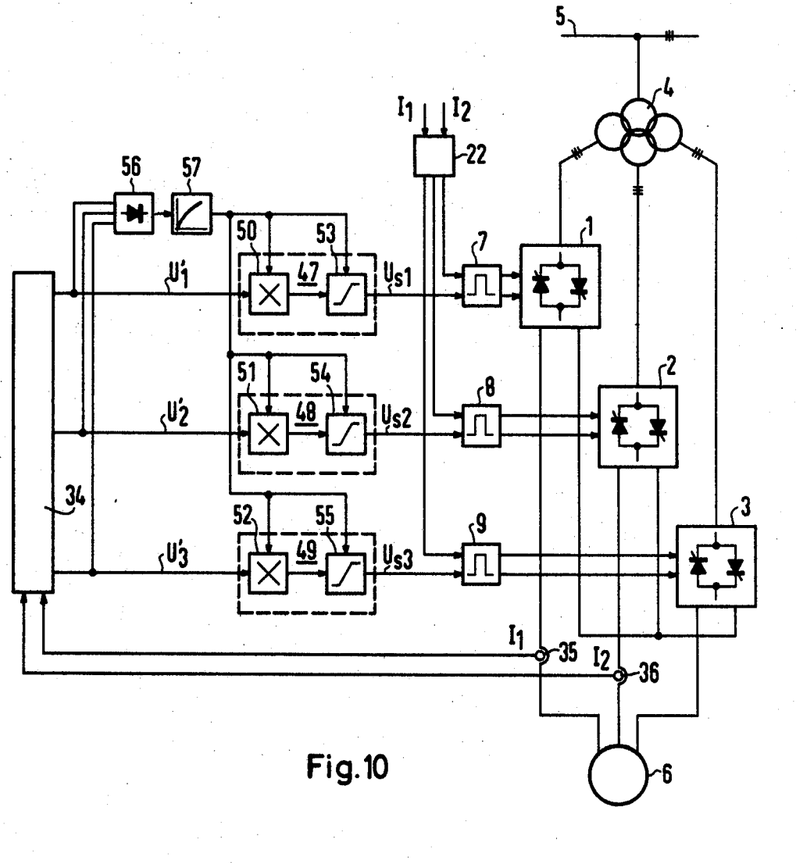
FIG. 10 shows a fourth embodiment of circuit arrangement in accord with the invention.

In FIG. 10, a further circuit arrangement is shown which corresponds to the circuit arrangement of FIG. 9 in as much as the control units 7, 8, 9 of the three converters 1, 2 and 3 again have control voltages $U_{s1}$, $U_{s2}$ and $U_{s3}$ given to them in such a way that the output voltages $U_1$, $U_2$ and $U_3$ of these converters have waveforms which are periodic, are offset relative to each other by 120°, and essentially contain no harmonics of the 5th and 7th order. Again each control voltage $U_{s1}$, $U_{s2}$ has been obtained from one of the three output voltages $U'_1$, $U'_2$, $U'_3$ of a control or regulating device 34. As in the previous cases, it is assumed that the output voltages $U'_1$, $U'_2$ and $U'_3$ are time-shifted relative to each other by 120° and have a sinusoidal waveform and that the control units 7, 8 and 9 operate linearly.

As shown in FIG. 10, output voltages $U'_1$, $U'_2$, $U'_3$ are supplied respectively, to the signal inputs of amplifier stages 47, 48, 49. The gain and the limiting characteristic of each amplifier stage 47, 48, 49 is set as a function of the crest value of the respective output voltage $U'_1$, $U'_2$, $U'_3$. The amplifier stages 47, 48, 49 deliver a voltage which is fed as control voltage $U_{s1}$, $U_{s2}$, $U_{s3}$ into the control units 7, 8, and 9.

As illustrated, each amplifier stage comprises a series connection of a multiplying member (i.e., members 50, 51, 52) with a limiting operational amplifier (i.e. amplifiers 53, 54, 55). One input of each multiplying member 50, 51, 52 and the limiting input of each operational amplifier 53, 54, 55 are connected to a series circuit comprising a rectifier 56, which is preferably a rectifier with uncontrolled valves in three-phase a.c. bridge connection, and an after-connected smoothing member 57 serving to smooth the pulsating d.c. voltage. The series circuit 56, 57 is fed by the output voltages $U'_1$, $U'_2$ and $U'_3$. As shown only one common series connection 56, 57 need be provided for all amplifier stages 47, 48 and 49. Each amplifier stage 47, 48, 49 is designed so that it furnishes a control voltage $U_{s1}$, $U_{s2}$, $U_{s3}$ according to waveform $U_{s3}$ of FIG. 8. Hence, the waveform of each control voltage $U_{s1}$, $U_{s2}$ and $U_{s3}$ corresponds in each half-cycle essentially to a sinusoidal function cut off between 37.5° and 142.5°. The fundamental frequency of each such waveform, moreover, has the same amplitude as its respective output voltage $U'_1$, $U'_2$, $U'_3$.

The function of the individual amplifier stages 47, 48, 49 is the same as that of the amplifier stage 23 in FIG. 7. Here again, therefore, there results at the output of each converter 1, 2, 3 a trapezoidal output voltage, a sinusoidal conductor current, and sinusoidal linked voltages.

What is claimed is:

1. A circuit arrangement for use with an a.c. voltage network and m-phase symmetrical load, said load having a first neutral point common to said phases, comprising:

a number m of direct converters arranged in an m-phase symmetrical Y configuration having a second neutral point which is common to said converters and not directly connected to said first point, each of said converters being adapted to be connectd to said network and to a different one of said phases of said load;

a number of control units, each of said control units developing an output voltage for controlling a different one of said converters;

means for developing a control voltage which is applied to at least one of said control units and is such that the output voltage of the converter associated with said one unit is caused to be periodic and to include the voltage across the phase of the load connected to said associated converter and at least one harmonic of an odd-numbered order divisible by $m$.

2. a circuit arrangement in accordance with claim 1 in which:
said number m is equal to 3;
the voltages across said phases of said load are substantially sinusoidal;
and said output voltage of said one converter includes at least one harmonic of the third order.

3. A circuit arrangement in accordance with claim 1 in which said output voltage of said one converter is substantially trapezoidal in form.

4. A circuit arrangement in accordance with claim 3 in which said output voltage of said one converter is symmetrical and in each 180° half cycle rises approximately linearly between 0° and (37.5° ± 5°), remains essentially constant between (37.5° ± 5°) and (142.5° ± 5°), and falls approximately linearly between (142.5° ± 5°) and 180°.

5. A circuit arrangement in accordance with claim 1 in which;
said means for developing comprises a voltage control loop;
and said circuit arrangement further includes a current control loop for each of said units, with the exception of said one unit, for regulating the load current provided by the converter controlled by that unit, each of said loops including a current generator for generating a nominal current value having a form corresponding to that desired of the current being regulated by that loop.

6. A circuit arrangement in accordance with claim 5 in which said nominal current values are sinusoidal.

7. A circuit arrangement in accordance with claim 5 in which said means for developing further includes means responsive to the Y-voltage across said first neutral and the output conductor of the converter associated with said one unit.

8. A circuit arrangement in accordance with claim 7 in which:
said responsive means includes means for tapping said Y-voltage; and
said control voltage is such that said output voltage is caused to have zero crossings coincident with said Y-voltage.

9. A circuit arrangement in accordance with claim 8 in which said means for developing further includes:
an amplifier stage having a gain and a limiting characteristic adjustable as a function of the crest value of at least the voltage across one of said phases, said amplifier being responsive to said Y-voltage and having an output connected to said one unit.

10. A circuit arrangement in accordance with claim 9 in which:
said amplifier stage further comprises;
a series circuit including a multiplying member connected in series with a limiting operational amplifier and said means for developing further includes:
a rectifier responsive to the voltage across one of said phases;
and a first smoothing member connected to the output of said rectifier, said first smoothing member having an output connected to one input of said multiplying member and to the limiting input of said operational amplifier.

11. A circuit arrangement in accordance with claim 10 in which:
said one unit operates linearly;
and said amplifier stage is designed to produce a sinusoidal output which, for each half cycle, is cut off between 37.5° and 142.5° and whose fundamental frequency has the same amplitude as said Y-voltage.

12. A circuit arrangement in accordance with claim 11 in which said means for developing further includes a second smoothing member connected between said tapping means and said amplifier stage.

13. A circuit arrangement in accordance with claim 9 which further includes:
another voltage control loop for regulating the difference voltage which appears across said first and second said neutrals.

14. A circuit arrangement in accordance with claim 13 in which:
said other voltage control loop includes a comparator which compares said difference voltage with a nominal voltage value;
a voltage regulator connected to the output of said comparator;
and an addition member connected to the output of said voltage regulator for developing an output for influencing said control voltage.

15. A circuit arrangement in accordance with claim 14 in which said voltage regulator acts as an integrator.

16. A circuit arrangement in accordance with claim 14 in which said addition member combines the output of said voltage regulator with the output of said first smoothing member.

17. A circuit arrangement in accordance with claim 14 in which the output of said addition member is applied to the inputs controlling the gain and limiting of said amplifier stage.

18. A circuit arrangement in accordance with claim 14 in which the time constant of said other voltage control loop is great in comparison to the cycle duration of the third harmonic of the output voltage of the converter controlled by said one unit.

19. A circuit arrangement in accordance with claim 18 in which said nominal voltage value is zero.

20. A circuit arrangement in accordance with claim 5 in which said voltage control loop includes a voltage generator for generating a nominal voltage value which has a trapezoidal waveform and forms said control voltage.

21. A circuit arrangement in accordance with claim 20 in which said voltage control loop further includes:
a comparator for comparing the output voltage of said one unit with said nominal voltage;
a voltage regulator having an input connected to said comparator and an output connected to said one unit.

22. A circuit arrangement in accordance with claim 20 in which said nominal voltage value corresponds to the Y-voltage across said first neutral and the output conductor associated with said one unit.

23. A circuit arrangement in accordance with claim 22 in which:
said voltage control loop includes means for tapping said Y-voltage and supplying it to said voltage generator;
and said voltage generator delivers a nominal voltage value which is such that said output voltage is caused to have zero crossings coincident with said Y-voltage.

24. A circuit arrangment in accordance with claim 23 in which said voltage generator includes:

an amplifier stage having a gain and limiting characteristic adjustable as a function of the crest value of at least the voltage across one of said phases, said amplifier stage being responsive to said Y-voltage and having an output connected to said one unit.

25. A circuit arrangement in accordance with claim 24 in which:
said one unit operates linearly;
and said amplifier stage is designed to produce a sinusoidal output which for each half cycle, is cut off between 37.5° and 142.5° and whose fundamental frequency has the same amplitude as said Y-voltage.

26. A circuit arrangement in accordance with claim 1 in which:
said means for developing generates a control voltage for each of said control units, each of said control voltages being such as to cause the output voltage of the converter associated with its respective control unit to be periodic.

27. A circuit arrangement in accordance with claim 26 in which said means for developing includes:
a regulating device responsive to the currents in two of said phases for developing a number of periodic voltages;
means for generating an additional voltage;
and summing means for combining each of said periodic voltages with said additional voltage to form said control voltages.

28. A circuit arrangement in accordance with claim 27 in which said additional voltage comprises one or more voltage components whose frequency is an odd multiple divisible by 3 of the fundamental frequency of said periodic voltages.

29. A circuit arrangement in accordance with claim 28 in which:
said means for generating said additional signal performs a frequency multiplication.

30. A circuit arrangement in accordance with claim 29 in which:
said means for generating said additional voltage includes a circuit branch comprising:
a frequency multiplying member responsive to one of said periodic voltages and having a multiplication factor n whose value can be anyone of the numbers in the sequence 3, 9, 15, 21 ... ;
and a multiplying member having the output of said frequency multiplying member as one input and a multiplication signal as another input;
and said summing means includes a number of addition members each of which combines one of said periodic voltages and said additional voltage to produce one of said control voltages.

31. A circuit arrangement in accordance with claim 30 in which said means for generating further includes a plurality of circuit branches each comprising:
a frequency multiplying member responsive to said one periodic voltage;
and a multiplying member connected to the output of said frequency multiplying member;
and a summing member for summing the outputs of said multiplying members and applying said sum signal to each of said addition members.

32. A circuit arrangement in accordance with claim 26 in which:
said control units are linear;
said means for developing further includes:
a regulating device responsive to the currents in two of said phases for developing three sinusoidal periodic voltages which are displaced by 120° relative to one another;
and three circuits each of which produces one of said control voltages and includes an amplifier stage which is responsive to one of said periodic voltages and which has a gain and limiting characteristic dependent on that one periodic voltage.

33. A circuit arrangement in accordance with claim 32 in which:
each of said amplifier stages includes a series circuit comprising a multiplying member connected to a limiting operational amplifier;
and said means for developing further includes:
a rectifier responsive to at least one of said periodic voltages;
and a smoothing member connected to the output of said rectifier and having an output connected to one input of each multiplying member and to the limiting input of each operational amplifier.

34. A circuit arrangement in accordance with claim 32 in which:
each of said amplifier stages includes a series circuit comprising a multiplying member connected to a limiting operational amplifier;
and said means for developing further includes:
a number of rectifiers, each being responsive to at least one of said periodic voltages;
and a number of smoothing members, each connected to the output of one of said rectifiers and each having an output connected to one input of one of said multiplying members and to the limiting input of the operational amplifier associated with that one multiplying member.

35. A circuit arrangement in accordance with claim 34 in which each of said amplifier stages is designed to deliver an output sinusoidal voltage which, in each half cycle, is cut off between 37.5° and 142.5° and which has a fundamental frequency whose amplitude is the same as the amplitude of the periodic voltage associated with that stage.

* * * * *